(12) United States Patent
Meinhard (10) Patent No.: US 11,383,594 B2
(45) Date of Patent: Jul. 12, 2022

(54) HYBRID MODULE HAVING A ROTATIONAL AXIS FOR A DRIVE TRAIN OF A MOTOR VEHICLE

(71) Applicant: Schaeffler Technologies AG & Co. KG, Herzogenaurach (DE)

(72) Inventor: Rolf Meinhard, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/261,374

(22) PCT Filed: Jul. 29, 2019

(86) PCT No.: PCT/DE2019/100693
§ 371 (c)(1),
(2) Date: Jan. 19, 2021

(87) PCT Pub. No.: WO2020/030220
PCT Pub. Date: Feb. 13, 2020

(65) Prior Publication Data
US 2021/0284009 A1    Sep. 16, 2021

(30) Foreign Application Priority Data
Aug. 7, 2018   (DE) .......................... 102018119192.8

(51) Int. Cl.
*B60K 6/48*     (2007.10)
*B60K 6/387*    (2007.10)

(52) U.S. Cl.
CPC ............... *B60K 6/48* (2013.01); *B60K 6/387* (2013.01); *B60K 2006/4825* (2013.01)

(58) Field of Classification Search
None
See application file for complete search history.

(56) References Cited

U.S. PATENT DOCUMENTS

| 8,813,935 | B2 * | 8/2014 | Hart | ....................... B60K 6/387 |
|  |  |  |  | 192/55.61 |
| 8,960,393 | B2 * | 2/2015 | Frait | ...................... B60K 6/405 |
|  |  |  |  | 192/85.25 |

(Continued)

FOREIGN PATENT DOCUMENTS

| CN | 104340046 A | * 2/2015 | ............... B60K 6/26 |
| DE | 102005053887 A1 | 5/2007 | |

(Continued)

*Primary Examiner* — Dirk Wright
(74) *Attorney, Agent, or Firm* — Kevin L. Parks (57) ABSTRACT

A hybrid module includes a driveshaft connection point for receiving a first torque, a transmission shaft connection point for outputting a second torque, a torque-receiving means for receiving a third torque from an electrical machine, and a dry multiplate clutch. The dry multiplate clutch includes an outer plate holder, torsionally rigidly connected to the transmission shaft connection point and to the torque-receiving means, an inner plate holder, torsionally rigidly connected to the driveshaft connection point, at least one outer plate axially movably mounted in the outer plate holder, and a plurality of inner plates, axially movably mounted in the inner plate holder to form a stack of plates together with the at least one outer plate. When the stack of plates is axially pressed with a target contact pressure, a target torque can be transmitted from the driveshaft connection point to the torque-receiving means and the transmission shaft connection point.

11 Claims, 4 Drawing Sheets

(56) References Cited

U.S. PATENT DOCUMENTS

| | | | |
|---|---|---|---|
| 9,579,965 B2 * | 2/2017 | Frait | ................ B60K 6/405 |
| 9,581,210 B2 * | 2/2017 | Frait | ................ B60K 6/48 |
| 2014/0124318 A1 | 5/2014 | Frait et al. | |

FOREIGN PATENT DOCUMENTS

| | | | | |
|---|---|---|---|---|
| DE | 102018103524 A1 | | 8/2019 | |
| DE | 102018103981 A1 | | 8/2019 | |
| FR | 3005902 A1 | * | 11/2014 | ............... B60K 6/26 |
| JP | 2013177940 A | | 9/2013 | |
| JP | 2010242824 A | | 11/2013 | |
| KR | 101489498 B1 | * | 2/2015 | |
| WO | 2008064813 A2 | | 6/2008 | |
| WO | WO-2009003438 A1 | * | 1/2009 | ........... F16D 13/648 |
| WO | WO-2012108259 A1 | * | 8/2012 | ............... B60K 6/26 |
| WO | WO-2015040285 A1 | * | 3/2015 | ............... B60K 6/26 |
| WO | 2015172784 A2 | | 11/2015 | |
| WO | WO-2016116084 A1 | * | 7/2016 | ............. B60K 23/02 |
| WO | WO-2019070776 A1 | * | 4/2019 | ............... B60K 6/26 |

* cited by examiner

HYBRID MODULE HAVING A ROTATIONAL AXIS FOR A DRIVE TRAIN OF A MOTOR VEHICLE

CROSS-REFERENCE TO RELATED APPLICATIONS

This application is the United States National Phase of PCT Appln. No. PCT/DE2019/100693 filed Jul. 29, 2019, which claims priority to German Application No. DE102018119192.8 filed Aug. 7, 2018, the entire disclosures of which are incorporated by reference herein.

TECHNICAL FIELD

The disclosure relates to a hybrid module having a rotational axis for a drive train of a motor vehicle, with at least the following components: a driveshaft connection point for receiving a torque; a transmission shaft connection point for outputting a torque; a torque-receiving means for receiving a torque from an electrical machine; and a dry multiplate clutch having two plate holders which can be rotated relative to one another about the rotational axis. Specifically, the clutch can include an outer holder and an inner holder with a stack of plates. It is only possible for a target torque to be transmitted from the driveshaft connection point to the torque-receiving means and to the transmission shaft connection point if the stack of plates is axially pressed with a target contact pressure. The inner holder is torsionally rigidly connected to the driveshaft connection point and the outer holder is torsionally rigidly connected to the transmission shaft connection point and the torque-receiving means.

BACKGROUND

Hybrid modules for a hybrid drive train are known from the prior art. These hybrid modules are designed to integrate a torque of an electrical machine into the (conventional) drive train having an internal combustion engine, a driveshaft, and a transmission having a transmission shaft. The hybrid module has a connection for, or includes, the (additional) electrical machine and a friction clutch for releasable coupling of the electrical machine for torque transmission. Alternatively, the electrical machine is designed as a main drive unit and the internal combustion engine can be switched by means of the friction clutch of the hybrid module or can be connected to the electrical machine to start up the motor (starting).

The electrical machine is, for example, arranged like an alternator, for example replacing the same, deviating from the motor axis of the internal combustion engine, usually parallel to the axis, and connected to the transmission shaft and/or that of the driveshaft by means of a traction drive, for example a (V-)belt drive, wherein the friction clutch is interposed. According to another embodiment, the electrical machine is arranged coaxially to the motor axis, i.e., in alignment with the driveshaft of the internal combustion engine, wherein the friction clutch is arranged in the center of the electrical machine, connected to the rotor of the electrical machine.

In a configuration in which the friction clutch is releasably connected to the driveshaft, said friction clutch is also referred to as K0 [clutch zero]. In a configuration in which said friction clutch is releasably connected to the transmission shaft, said friction clutch is also referred to as K1 [clutch one].

It is possible for a torque to be transmitted to the driveshaft and/or to the transmission shaft with the electrical machine, whereby a torque emitted by the driveshaft can be superimposed, i.e., a so-called boost occurs. In certain applications, starting the internal combustion engine, i.e., drag-starting the driveshaft from a standstill, is also made possible by means of the electrical machine. Thus, it is possible to dispense with the starter motor and starter ring gear previously used. Furthermore, in certain applications, the electrical machine can be operated as a generator, i.e., it is designed to convert a torque input from the outside into electrical energy. The torque input from the outside is input by the transmission, i.e., for recuperation, or the internal combustion engine, and the electrical energy can be emitted directly or via an accumulator to an electrical consumer.

In certain applications, a further electrical machine is provided as an electrical drive motor, by means of which (e.g. purely) electric driving is possible. This electrical drive motor transmits a torque to the transmission either in parallel with the internal combustion engine or alone. The latter is referred to as purely electric driving. The internal combustion engine is thus used as an energy source, for example as a so-called range extender, if the electrical accumulator no longer has sufficient energy available. This occurs in the form of a torque output to the transmission and/or a charging of the electrical accumulator via the electrical machine of the hybrid module. If the corresponding switching states of the internal combustion engine are both to be available separately, both a K0 clutch and a K1 clutch are required, wherein the friction clutch of the hybrid module then forms the K0 clutch, and the K1 clutch is connected downstream of the hybrid module in the torque train from the driveshaft to the transmission. If the K1 clutch is interposed, the transmission shaft connection point of the hybrid module is connected via a module shaft to the K1 clutch shaft input, and is only indirectly, in fact releasably, connected to a transmission input shaft via the K1 clutch.

In many applications, it is desirable for the friction clutch of the hybrid module to be designed with a small outer diameter. To then be able to transmit the required torque, a multiplate clutch may be used as a friction clutch. A dry multiplate clutch may be used, for example, which is simpler to implement and has sufficient wear resistance for the application. In addition, the efficiency is generally higher due to the lower co-rotating mass in comparison to a wet multiplate clutch in which the coolant is carried along.

A multiplate clutch has at least one friction plate and a corresponding number of counterplates. The number of counterplates is determined by the construction of the multiplate clutch. Generally, a friction plate has one friction surface in the axial direction on the left and the right, which can be brought into contact with a friction surface of the adjacent counterplate and pressed for frictional force transmission. The friction plates are thus axially movably mounted in a plate holder, for example as outer plates in the so-called outer holder. The counterplates are axially movably mounted in a further plate holder, for example in a corresponding manner as inner plates in the so-called inner holder. The friction plates should therefore be able to be brought into frictional contact with a corresponding friction surface on the left and the right in the axial direction. Thus, on an axial outer side of the stack of plates, for example left of the first (viewed from left to right) friction plate, a contact pressure plate or a pressing plate is provided which, on the side facing the first friction plate, corresponding for example to the right, has a first (friction plate-side) friction surface and, on the opposite side, corresponding for example to the left, has a force application surface for introducing a contact pressure.

On the other axial outer side of the stack of plates, for example right of the last (viewed from left to right) friction plate, a corresponding friction plate-side friction surface is itself formed by the friction plate-side plate holder itself, for example the inner holder. Such a configuration results in a number (n−1) of counterplates (comprising friction surfaces on both sides) corresponding to one less than the number (n) of friction plates. It should be noted that the contact pressure plate or the pressing plate is not referred to as the counterplate here. In this configuration, the number of friction pairings corresponds to twice the number of friction plates. However, other configurations are also possible, wherein the highest possible number of friction pairings should be achieved with the lowest possible number of plates.

To transmit a torque, the plates of the stack of plates are axially pressed together and thus a torque can be transmitted frictionally, which in the first approach corresponds to the product of the average radius of the friction surfaces, the contact pressure, the coefficient of friction and the number of friction pairings. For example, the contact pressure is provided by a central slave cylinder in the center of the plate holders releasing a membrane spring, also referred to simply as a disk spring, from a deflected position into an engaged position as a result of a disengagement, so that the spring force of the membrane spring is applied to the contact pressure plate or the pressing plate. Under certain circumstances, further elements may be interposed axially, such as a modulation spring and/or a pressure pot, wherein the pressure pot may simultaneously form the transmission element between the central slave cylinder and the membrane spring and/or between the membrane spring and the modulation spring.

If no torque is to be transmitted, the plates of the stack of plates are axially spaced apart from one another, for example by the central slave cylinder deflecting the membrane spring and thus preventing the introduction of spring force from the membrane spring onto the stack of plates. The plates are automatically spaced apart from one another in the manner of a slipping clutch as a result of opposing torques, or are actively separated from one another by a spring device. A separation means that in this case there is actually no more contact, i.e., no torque can be transmitted, or that the remaining axial force in the direction of the spring force pressing the stack of plates is so low that the drag torque which is still transmittable is negligible or at least sufficiently low for the counter forces in the system. For example, the transmittable torque is so low that the rotor shaft of the electrical machine cannot be set in rotation by the transmittable torque generated by the internal combustion engine or, vice versa, the crankshaft of the internal combustion engine cannot be set in rotation by the electrical machine.

A plate holder, which is also referred to as a plate pot, is connected to a shaft hub or forms such a shaft hub in one piece so that said plate holder can be permanently connected to the driveshaft and/or the transmission shaft in a torque-transmitting manner. For example, the outer holder is connected to the driveshaft, and, in one embodiment, a torsional vibration damper and/or a torsional vibration absorber is interconnected therebetween and/or in parallel. The inner holder is connected to a torque-receiving means and/or the transmission input shaft or the module shaft. The torque-receiving means may be a traction disk or a rotor or a rotor connection. The torque-receiving means may be designed both for receiving and for outputting a torque so that, for example, both a boost, i.e. torque-receiving means from the electrical machine to the multiplate clutch, as well as a generator mode, i.e., torque output to the electrical machine from the multiplate clutch, is possible.

Currently, the internal combustion engine is often still started by means of a starter ring gear and a separate starter motor, i.e., another electrical machine. This is due to the fact that although sufficient torque can be achieved to start the internal combustion engine cold, power transmission via the multiplate clutch of the hybrid module, which is designed as a K0 clutch, is insufficient. Two different types of start are to be distinguished between, specifically direct starting and dynamic starting. With direct starting, the warm internal combustion engine is started when the rotor shaft of the electrical machine is accelerated to the required starting speed from standstill with a closed K0 clutch.

With dynamic starting, the rotor shaft of the electrical machine, with an open K0 clutch, is first brought to a required cold start speed, and only then is the K0 clutch closed (by grinding). The crankshaft of the cold internal combustion engine is then raised to the required starting speed. With dynamic starting, vibrations occur which lead to unpleasant noise development. In this respect, it has been found that this is caused by the softness of the multiplate clutch, which allows vibrating slipping of the antagonistic friction surfaces of the stack of plates which have been brought into contact or are in the engaging process.

SUMMARY

The disclosure relates to a hybrid module having a rotational axis for a drive train of a motor vehicle having at least the following components: a driveshaft connection point for receiving a torque; a transmission shaft connection point for outputting a torque; a torque-receiving means for receiving a torque from an electrical machine; and a dry multiplate clutch having two plate holders, which can be rotated relative to one another about the rotational axis. The two plate holders may be an outer holder and an inner holder. At least one outer plate is axially movably mounted in the outer holder and a number of inner plates corresponding to one more than the number of outer plates is axially movably mounted in the inner holder such that the at least one outer plate and the corresponding number of inner plates form a stack of plates. A target torque can be transmitted from the driveshaft connection point to the torque-receiving means and/or to the transmission shaft connection point if the stack of plates is axially pressed with a target contact pressure.

The disclosed hybrid module may include an inner holder that is torsionally rigidly connected to the driveshaft connection point, and an outer holder that is torsionally rigidly connected to the transmission shaft connection point and the torque-receiving means.

In the following, if the axial direction, radial direction or the circumferential direction and corresponding terms are used without explicitly indicating otherwise, reference is made to the mentioned rotational axis. Unless explicitly stated otherwise, ordinal numbers used in the previous and subsequent descriptions are used only for the purposes of clear distinction and do not indicate the order or ranking of the designated components. An ordinal number greater than one does not necessarily mean that another such component must be present. It should be noted that although a permanent torque-transmitting connection cannot be separated while in use, it can optionally be equipped with a damping device and/or a torsional vibration absorber so that vibration damping and/or vibration decoupling can be achieved. Conversely, a torsionally rigid connection is not provided with a damping device or a vibration absorber, and damping effects are due to low and negligible softness of a component material and/or of a connection, as occurs, for example, in a torque transmission by means of a splined joint. A torsionally rigid connection is thus a special case of a permanent torque-transmitting connection.

The hybrid module is thus designed to releasably connect an internal combustion engine and an electrical machine to a consumer in a torque-transmitting manner. Thus, the hybrid module has a driveshaft connection point for receiving a torque from a driveshaft of an internal combustion engine, wherein often a torsional vibration damper, for example a dual-mass flywheel is interposed and/or a torsional vibration absorber, for example a centrifugal pendulum, is connected in parallel, so that the driveshaft connection point is then only indirectly connected to the drive shaft, in fact in a vibration-decoupled manner. However, the connection between the driveshaft connection point and the output side of a decoupling device, for example the secondary mass of a dual-mass flywheel, is permanently connected to the combustion engine-side plate holder, i.e., here the inner holder, in a torque-transmitting manner; thus, said connection cannot be separated by the input of a signal and/or a force, and thus does not comprise a separating clutch.

Furthermore, the hybrid module has a transmission shaft connection point for outputting a torque to a consumer, wherein the consumer [has] at least one drive wheel to drive the motor vehicle, for example. However, auxiliary units are often driven via a separate auxiliary drive train, for example a traction drive. For certain applications, a further separating clutch, for example a friction clutch, may be connected as a K1 clutch of the transmission input shaft upstream of the hybrid module so that the hybrid module can be decoupled from the transmission and at least one of the consumers. Thus, the transmission shaft connection point is connected via a module shaft to the clutch input of the K1 clutch. The K1 clutch releasably connects said module shaft to the transmission input shaft. In certain embodiments, further or only here at least one torsional vibration absorber or even one torsional vibration damper are interposed with corresponding adjustments of the shafts.

Lastly, the hybrid module also has a torque-receiving means for receiving a torque from an electrical machine, but also for torque output to the electrical machine which can be operated in generator mode, for example for recuperation of the braking energy of the motor vehicle. For example, the torque-receiving means is a friction disk or a carrier which can be permanently connected to a friction disk in a torque-transmitting manner. Alternatively, the torque-receiving means is a rotor or a rotor carrier or a carrier which can be permanently connected thereto in a torque-transmitting manner. In this embodiment, the stator and its torque support may be integrated into the hybrid module, and the entire hybrid module can be integrated into a housing of the transmission, for example the transmission bell housing.

A dry multiplate clutch having two plate holders, which can be rotated relative to one another about the rotational axis, is provided in the center of the hybrid module, and the multiplate clutch is designed conventionally, for example relative to the functional principle. Thus, an outer holder and an inner holder are provided, which can be rotated relative to one another about the rotational axis. At least one outer plate is axially rotatably mounted in the outer holder and a number of inner plates corresponding to one more than the number of outer plates is axially moveably mounted in the inner holder, for example, four outer plates and five inner plates are provided.

A target torque can be transmitted from the driveshaft connection point to the torque-receiving means and to the transmission shaft connection point if the stack of plates is axially pressed with a target contact pressure. Transmission of such a torque is interrupted in the unpressed state of the stack of plates or is reduced to a sufficiently low drag torque.

The inner holder may be torsionally rigidly connected to the driveshaft connection point. And the outer holder may be torsionally rigidly connected to the transmission shaft connection point and the torque-receiving means. This configuration is the opposite of the known embodiments of the current prior art. Here, the connection of the inner holder to the driveshaft connection point, and of the outer holder to the transmission shaft connection point or to the torque-receiving means in a tilt-resistant manner may be a long axially overlapping connection, or an integral design.

In this configuration, the inner holder is designed with a small radial expansion and thus with a short lever. Thus, the inner holder can be designed to be very rigid in relation to slip vibrations in the stack of plates resulting from the driveshaft of the internal combustion engine being raised from a standstill by the electrical machine of the hybrid module during a cold start. The outer holder is less subject to such loads because the electrical machine does not normally generate torsional vibrations in a relevant excitation frequency range. In one embodiment, the outer holder is also directly or indirectly supported via the rotor carrier, which is rigidly supported, for example via the bearing of the transmission shaft connection point. Such a bearing is often designed as a double row axially tensioned rolling bearing, for example in an O arrangement. Such a rigid bearing can keep the gap size between the rotor and the stator sufficiently constant during operation.

This not only reduces or even eliminates noise emission when engaging the multiplate clutch, but also considerably reduces wear on the friction linings of the stack of plates. Sporadically occurring frictional vibrations significantly influence the torque build-up and the desired friction torque. The frictional vibrations can shake the plates (axially) free, so that the (axial) displacement friction in the plate toothing is (not constantly) reduced and opposes the contact pressure; this in turn causes fluctuations in the maximum transmittable torque. If the development of frictional vibrations is prevented by the above-mentioned measures, the torque build-up can be made more constant.

According to an example embodiment of the hybrid module, the inner holder is radially supported on the transmission shaft connection point by means of a rolling bearing, and the rolling bearing is arranged axially overlapping with the stack of plates.

In this embodiment, on the one hand, the rigidly mounted transmission shaft connection point is used as a radial counterbearing, as is also known conventionally. However, the rolling bearing of the inner holder is also arranged axially overlapping the stack of plates. Thus, an axial lever proportion to the axial center of the development of the vibrations to be avoided in the stack of plates is very short or even zero. The rigidity of the inner holder against tilting vibrations and deformation vibrations about a circumferential axis is thus increased. For such applications, noise emissions during cold starting can be prevented or, in the present noise control concept of the motor vehicle concerned, at least reduced or shifted to a region where they are no longer perceptible to the driver.

According to an example embodiment of the hybrid module, the outer holder is designed to be slotted, and a dust deflector may be arranged radially outside of the stack of plates.

For an increased radial installation space for the stack of plates and thus an increased transmittable maximum (target) torque with the same contact pressure, it is proposed here to design the outer holder to be slotted. This means that, unlike in known embodiments, the outer holder is not formed with an embossed shape which also reproduces the radially inner plate stops on the radially outer side. Rather, the plate stops are formed by radially inner slot-shaped recesses in the outer holder. In an example embodiment, the slots are formed to be radially continuous so that the corresponding outer lugs of the outer plates can be placed to completely radially overlap with the radial wall thickness of the outer holder in the region of the slots. Thus, the transmittable torque between the outer holder and the outer plates is sufficiently large.

In an embodiment with radially continuous slots, in which a surrounding component is to be protected from abrasion and dust escaping from the stack of plates, one or a plurality of dust deflectors may be arranged radially outside of the stack of plates or at least radially outside of the slots. The dust deflector may be formed of thin and/or light material. For example, the dust deflector is designed as a pipe pointing away from the rotor and positioned radially outwards. The dust and/or abrasion can be removed during operation by centripetal force and/or a cooling air flow.

According to an example embodiment of the hybrid module, the outer holder includes a plate carrier, and the plate carrier is formed in one piece with the torque-receiving means, e.g., with the rotor carrier.

The outer holder is formed in one piece as a pot, for example in a deep-drawn manner. Alternatively, the outer holder includes a plurality of individual parts which are joined together, for example welded or positively connected by means of toothing. The plate carrier is the component of the outer holder in which the outer plates are permanently and axially movably mounted in a torque-transmitting manner. For example, this plate carrier is designed to be slotted or formed as described previously. The plate carrier is connected to the torque-receiving means, i.e., for example directly or indirectly connected to the rotor of the electrical machine or to a belt pulley of a belt drive with an off-axis electrical machine. The plate carrier may form a holder for the rotor and/or form the rotor carrier extending radially inward to the rolling bearing in one piece, or may integrally take on this function. In an example embodiment, the plate carrier with a component for positive connection to the transmission input shaft or the module shaft also forms a bearing seat for the inner holder, for example designed as described previously.

In an alternative embodiment, the outer holder is formed separately from the torque-receiving means and is held pretensioned axially movable relative thereto, for example by means of a spring means, for example a leaf spring. Alternatively, the stack of plates is pressed with it or pressing is supported. The outer plate carrier is connected to the rotor carrier via leaf springs. For example, the leaf springs are inclined or preformed when viewed tangentially. Thus, the contact pressure can be increased (pull direction) and decreased (push direction) by the circumferential force occurring when closing. The greater the inclination of the leaf springs, the greater an achievable gain. For example a gain of 50% may be possible. Thus, the disk spring force and the disengaging force can be reduced.

The axially movable outer holder may be designed as a tie rod with a contact pressure plate formed in one piece or mounted separately.

According to an example embodiment of the hybrid module, a normal spring and a pressure pad are provided for pressing the stack of plates. The pressure pad has the following sections: an outer section for transmitting an axial force to the stack of plates; an inner section for receiving an axial actuating force from an actuating device; and a central section. The normal spring is effectively pretensioned against the central section, such that the stack of plates is held by the normal spring in a normal state, and the outer section is designed to be axially soft, such that the pressure pad forms a modulation spring delaying the transmission of an axial contact pressure on the stack of plates.

In this embodiment, the pressure pad is also formed as a modulation spring, in that the outer section, i.e., the radial outer region, is designed to be so soft. A modulation spring, or here the elasticity of the pressure pad, increases the ratio of actuator travel to coupling torque. Increasing the actuator travel increases the resolution of the torque and the set torque is more robust against fluctuations, tolerances, thermal changes, and more.

The normal spring, for example a membrane spring, also referred to as a disk spring, or a membrane spring set may be supported between an axially fixed component, for example a rotor carrier or belt pulley carrier, and act in a pretensioned manner against the pressure pad in such a way that the stack of plates is pressed with it. The actuating device, for example a central slave cylinder, e.g., a concentric slave cylinder (CSC) or a ball-ramp system, acts on the inner cutaway, i.e., on the radially inner region, and opens the multiplate clutch when actively activated from the outside, for example when pressure builds up in the slave cylinder of the CSC. The central section is radially between the outer section and the inner section, but not necessarily exactly in the center. The position is to be designed according to the desired spring characteristic of the normal spring and the integrally formed modulation spring.

Irrespective of the previous embodiment of the normal spring, the pressure pad may be designed in one piece with a tie rod or via a positive fit together with a tie rod in order to contract the stack of plates.

In one embodiment, neither a normal spring nor a central section is provided, and no leaf springs or lining springs may be provided. The pressure pad may be designed for active pressing, i.e., the stack of plates is separated normally or the multiplate clutch is open normally. Irrespective of the normal state of the multiplate clutch, the pressure pad still has the integral function of the modulation spring.

According to a further aspect, a drive train is proposed including an internal combustion engine having a driveshaft, a transmission having a transmission shaft and an electrical machine. The electrical machine can be coupled between the driveshaft and the transmission shaft by means of the torque-receiving means of a hybrid module according to an embodiment according to the above description, in that a torque transmission can be released between the electrical machine and the transmission shaft by means of the dry multiplate clutch of the hybrid module.

The drive train is thus designed to transmit a torque provided by an engine, for example an internal combustion engine or an electrical drive motor, and delivered via its driveshaft to at least one consumer. An exemplary consumer is at least one drive wheel of a motor vehicle and/or an electric generator for providing electrical energy. Conversely, it is also possible to receive inertial energy from a drive wheel, for example. This inertial energy may be transmitted by means of the hybrid module to the electrical machine, which can be operated as a generator, for recuperation, i.e., for electrical storage of braking energy. Furthermore, in an example embodiment, it is possible for a torque to be transmitted to a consumer from the internal combustion engine and from the electrical machine by means of the multiplate clutch. In this respect, reference is made to the known requirements for a drive train, for example in the application in a motor vehicle.

In order to transmit torque in a targeted manner and/or by means of a manual transmission having different transmission ratios or to separate a transmission of torque from the electrical machine and/or the internal combustion engine from a consumer, the multiplate clutch described above may be used. The multiplate clutch according to the present description is designed to be rigid against slip vibrations and is suitable for use as the K0 clutch in a hybridized drive train with a conventional configuration without a powerful electrical machine (combustion engine drive train), but only with an alternator, wherein the alternator is replaced by the hybrid module. The installation space required for the hybrid module is low and the usual low and/or usual noise emission can still be maintained.

According to an example embodiment of the drive train, the electrical machine is designed for electric driving, and may be permanently connected to the transmission shaft in a torque-transmitting manner.

In this embodiment, the electrical machine of the hybrid module is designed for purely electric driving, so that the power distribution between the internal combustion engine and the electrical machine (of the hybrid module) can no longer be described as a hybridization of a conventional combustion engine drive train. However, at the same time, the required installation space is similar to that of a pure combustion engine drive train, so that in certain circumstances a conventional combustion engine configuration and a powerful hybrid configuration can be provided in the same installation space configuration without a great deal of effort.

In one embodiment, the internal combustion engine can then be started during operation (propulsion) of the at least one drive wheel of a motor vehicle because a further clutch towards the transmission is dispensed with. In an alternative embodiment, a K1 clutch is connected upstream of the transmission input, so that the internal combustion engine can also be started when the motor vehicle is at a standstill. In both cases, the speed difference between the electrical machine and the internal combustion engine is achieved by the multiplate clutch when starting.

In a further alternative embodiment, a K0 clutch is connected upstream of the hybrid module on the combustion engine side, and the multiplate clutch forms a K1 clutch. This configuration functionally corresponds to the previously described embodiment with the multiplate clutch as a K0 clutch and downstream K1 clutch.

According to a further aspect, a motor vehicle is proposed, including at least one drive wheel which can be driven by means of a drive train according to an embodiment as described above.

Many motor vehicles nowadays have front-wheel drive and therefore preferably place at least one drive machine, for example an internal combustion engine and/or a (further) electric drive motor, and/or the (at least one) electrical machine in front of the driver's cab and transverse to the main driving direction. The installation space is small in such an arrangement, and it is therefore advantageous to use a small-sized belt hybrid module. However, for embodiments with a rear arrangement, the installation space is also limited, for example due to a large freely usable trunk space. The use of a hybrid module in motorized two-wheeled vehicles is similar, for which an increased performance with the same installation space is required.

This problem is aggravated for passenger cars of the small car class according to the European classification, although these are the focus for hybridization. The functional units used in a passenger car of the small car category are not significantly reduced in size compared to passenger cars of larger car categories. Nevertheless, the available installation space for small cars is considerably smaller. The drive train described above has a small-sized multiplate clutch. At the same time, noise emissions are extremely low, even with a powerful electrical machine that can be connected to the hybrid module coaxially in the hybrid module or with an off-axle, torque-transmitting electrical machine that can be connected to the hybrid module via a traction drive, e.g. designed for purely electric driving for city traffic with an attainable maximum speed of 60 km/h [sixty kilometers per hour]. The production of the hybrid module is also cost-effective.

Passenger cars are assigned to a vehicle category according to, for example, size, price, weight, and performance, and this definition is subject to constant change based on the needs of the market. In the US market, vehicles in the small car and microcar categories are assigned to the subcompact car category according to European classification, while in the British market they correspond to the super-mini car and city car categories respectively. Examples of the small car category are the Alfa Romeo Mito, Volkswagen Polo, Ford Fiesta or Renault Clio. Well-known full hybrids in the small car category are the BMW i3, Audi A3 e-tron or Toyota Yaris Hybrid.

BRIEF DESCRIPTION OF THE DRAWINGS

The disclosure described above is explained in detail below based on the relevant technical background with reference to the associated drawings, which show example embodiments. The disclosure is in no way restricted by the purely schematic drawings, while it should be noted that the drawings are not dimensionally accurate and are not suitable for defining proportions. In the following.

DETAILED DESCRIPTION

Figure 1:
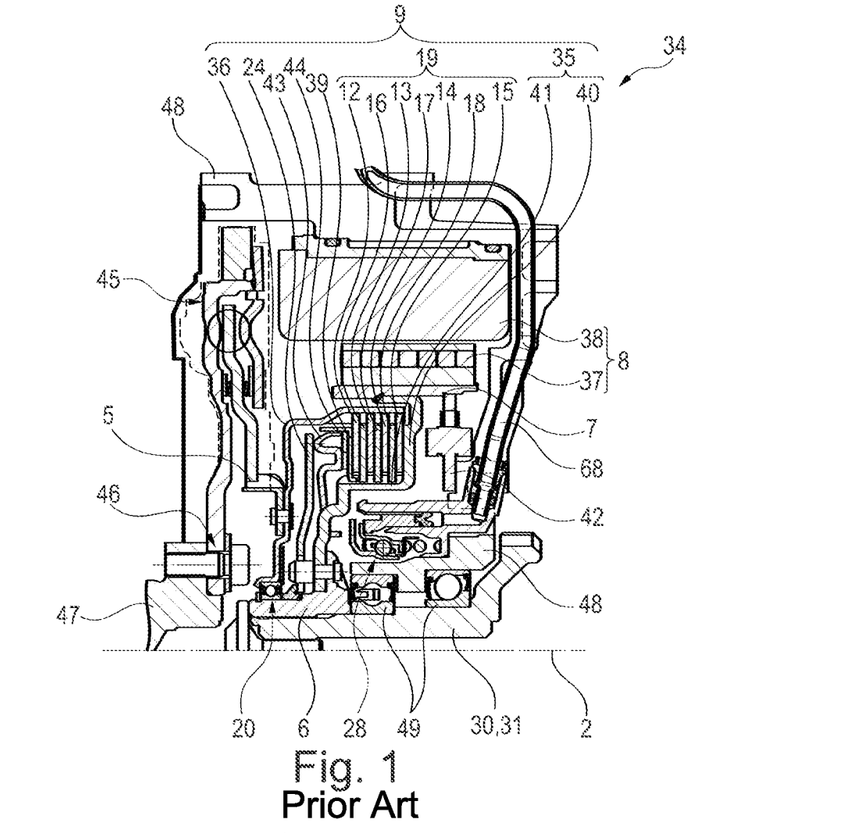
FIG. 1 shows a conventional hybrid module with a central multiplate clutch.

FIG. 1 shows a conventional hybrid module 34 having a rotational axis 2, in which a multiplate clutch 9 is arranged coaxially within an electrical machine 8 centrally close to the rotational axis 2. On the left of the illustration, there is a cutaway of a driveshaft 47 of an internal combustion engine 50 (not shown, see FIG. 2 or FIG. 7) for switchable torque transmission to the transmission shaft 31 or the module shaft 30 by means of the multiplate clutch 9. The driveshaft 47 is connected via a drive mount 46 (here by means of a screw connection to the primary mass) of a dual-mass flywheel 45, and the dual-mass flywheel 45 (here with its secondary mass) is connected to the driveshaft connection point 5 (here designed as splined joint) of the conventional hybrid module 34. However, for the sake of clarity, this is implemented in the same way for the hybrid modules 1 according to FIGS. 3 to 6 without restriction of the generality.

In FIG. 1, the driveshaft connection point 5 is connected to a conventional outer holder 36, which is radially inwardly supported on the transmission shaft connection point 6 by means of a rolling bearing 20. Here, it can be seen that the rolling bearing 20 is arranged axially offset to the stack of plates 19. In the conventional outer holder 36, outer plates 12 to 15 are axially movably and permanently mounted in a conventional (here formed) plate carrier 41 of the stack of plates 19 in a torque-transmitting manner. The same stack of plates 19 includes inner plates 16 to 18, which are arranged antagonistically and in axial alternation to the outer plates 12 to 15 and are mounted in a conventional inner holder 35 with which they are permanently and axially displaceable in a torque-transmitting manner. Furthermore, a pressing plate 39 is mounted in the conventional inner holder 35 like one of the inner plates. Furthermore, a counterplate 40 is formed in one piece with the conventional inner holder 35.

For torque transmission from the conventional outer holder 36 to the conventional inner holder 35, the stack of plates 19 is pressed axially by means of the normal spring 24, which is here designed as a membrane spring or a disk spring, by means of a conventional pressure pad 43 and a modulation spring 44 (here designed separately) in the normal state, so that the multiplate clutch 9 is designed in a normally closed configuration.

An actuating device 28 is provided to achieve a torque transmission from the driveshaft 47 to the transmission shaft 31 or the module shaft 30 (and to the torque-receiving means 7), which actuating device is designed in this case as a hydrostatic slave piston having a disengaging bearing. In this case, the actuating device 28 is supplied from the outside via a hydrostatic line 68. The disengaging bearing works against the conventional pressure pad 43 antagonistically to the normal spring 24, so that the normal force (from left to right in the illustration) resulting from the installation-related pretensioning of the normal spring 24 on the stack of plates 19 is reversed.

In this case, the conventional inner holder 35 is positively connected to the torque-receiving means 7, for example, which is connected to the rotor 37 of the electrical machine 8, which can be rotated about the rotational axis 2 by the stator 38. The rotor 37 is connected to the transmission shaft connection point 6 by means of the conventional inner holder 35 and is supported on the housing 48 by means of the module shaft 30 or the transmission shaft 31 and the central bearing 49. The speed of the rotor 37 can be detected by means of a rotor position sensor, a so-called resolver 42.

The conventional inner holder 35 is connected to the transmission shaft connection point 6, which is permanently connected to a module shaft 30 or a transmission shaft 31 (irrespective of whether a K1 clutch 53 (see FIG. 2 or FIG. 6) is provided) in a torque-transmitting manner by means of splined joint. Via a central bearing 49, here formed by two separate ball bearings, the module shaft 30 or the transmission shaft 31 and thus the entire multiplate clutch 9 is rotatably supported relative to the housing 48.

Figure 2:
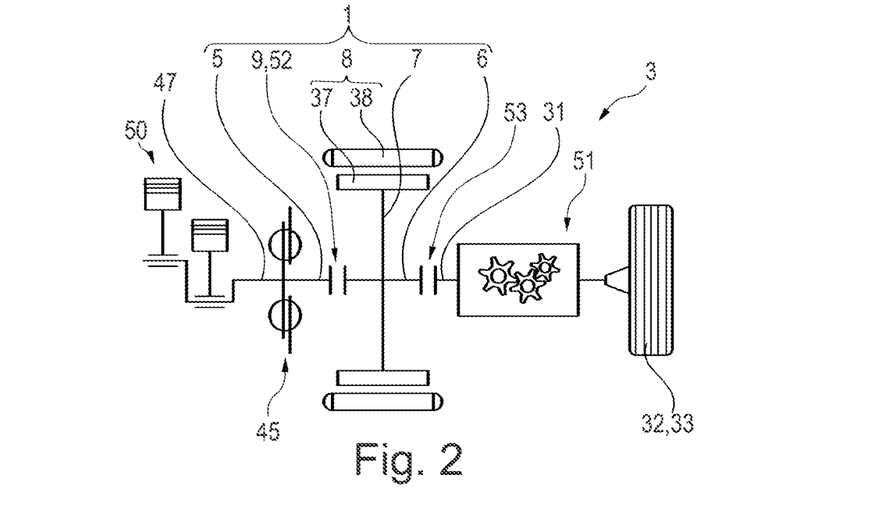
FIG. 2 schematically shows a drive train having a hybrid module.

FIG. 2 shows a schematic illustration of a (hybridized) drive train 3, wherein an internal combustion engine 50 can be seen in the left of the illustration, here with two pistons, which is permanently connected with its driveshaft 47 via a dual-mass flywheel 45 to the driveshaft connection point 5 of the hybrid module 1 in a torque-transmitting manner. The electrical machine 8 of the hybrid module 1 is torsionally supported with its stator 38 (for example on a housing 48, see FIG. 3). The rotor 37 is permanently, e.g., torsionally rigidly, connected to the torque-receiving means 7 in a torque-transmitting manner. To start the internal combustion engine 50, the multiplate clutch 9, which in this case is designed as a K0 clutch, is closed. In order to transmit torque of the electrical machine 8 of the hybrid module 1 to the consumer, in this case, for example, a drive wheel 32 or 33, by means of a transmission 51, for example a transmission gearing, here a K1 clutch 53 can be closed with the transmission shaft connection point 6, which makes a torque releasably transmittable via a transmission shaft 31. To provide torque from the internal combustion engine 50 to the electrical machine 8, both the K0 clutch 52 and the K1 clutch 53 should be closed. In one embodiment, the K1 clutch is designed as a positively closing separating clutch, for example as a so-called wedge clutch. In another embodiment, the K1 clutch 53 is omitted, so that the rotor 37 of the electrical machine 8 is permanently co-rotated with the drive wheels 32, 33.

Figure 3:
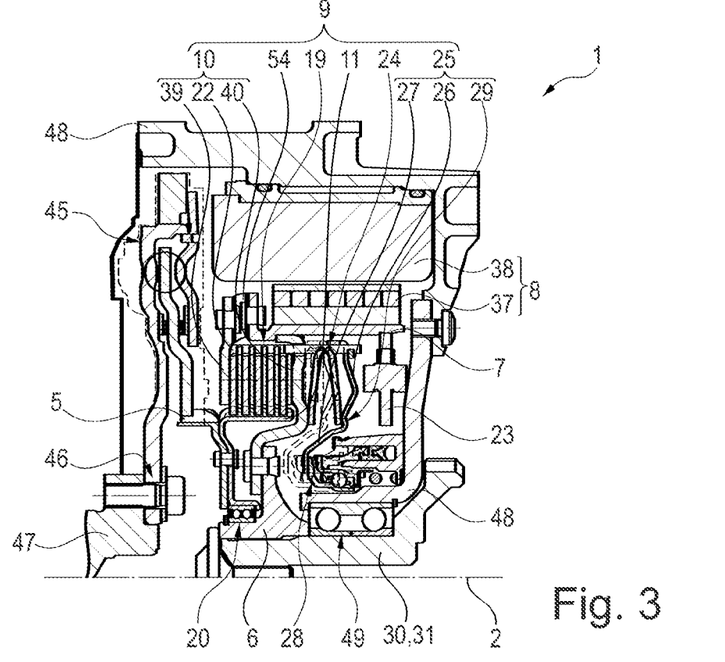
FIG. 3 shows a hybrid module having an axially movable outer holder.

FIG. 3 shows a hybrid module 1 having a rotational axis 2, in which the inner holder 11 and the outer holder 10 are now functionally inverted such that the inner holder 11 is torsionally rigidly connected to the driveshaft connection point 5, and the outer holder 10 is torsionally rigidly formed with the torque-receiving means 7 and the transmission shaft connection point 6. In the overall function, the configuration shown corresponds to the conventional embodiment, for example according to FIG. 1, such that reference is made to the description at that point. For example, the stack of plates 19 is designed in a conventional manner and comprises a plurality of outer plates and inner plates. The multiplate clutch 9 in this case is also designed to be normally closed.

In all of the illustrated multiplate clutches 9 in FIGS. 3 to 6, at least two positions of the actuating device 28 and the pressure pad 25 (and optionally the normal spring 24) are shown, in fact in the disengaged and in the engaged state, in new condition and with maximum wear or signs of subsidence. One of the two positions is illustrated with dashed lines. These set out the extreme positions for which an axial actuation travel with corresponding installation length must be provided.

The rolling bearing 20, which is now designed for the bearing of the inner holder 11, is arranged axially overlapping the stack of plates 19. Thus, the possible tilting torque or bending torque on the inner holder 11 is low compared to an embodiment according to FIG. 1. However, it should be noted that this is an optional feature. Due to the axial installation space made available in this configuration, the rolling bearing 20 is designed in two rows, Whereby an increased tilting-resistance is also achieved compared to a single row rolling bearing. Alternatively, the rolling bearing 20 is designed in one row and/or with a large rolling element or other rolling element types, for example needles or cylinders.

In the configuration according to FIG. 3, the outer holder 10 is designed to be axially movable like a tie rod, wherein the outer holder 10 integrally comprises the contact pressure plate 39 and the plate carrier 22, here designed to be slotted. The counterplate 40 is formed of an axially fixed component of the outer holder 10, which extends radially, for example in the shape of a disk, and is torsionally rigidly connected to the transmission shaft connection point 6. In order to press the stack of plates 19, a normal spring 24, or in this case a spring set having two alternately positioned membrane springs or disk springs, is provided, which works against a central section 29 of a pressure pad 25 with an axial force (normal force, to the right according to the illustration). Thus, the stack of plates 19 is (normally) pressed by means of the contact pressure plate 39 of the outer holder 10 acting as a tie rod.

This normal force of the normal spring 24 is transmitted to the outer holder 10 via the outer section 26 of the pressure pad 25, which is designed to be soft so that it has the properties of a modulation spring, i.e., an extended torque displacement characteristic and thus performs better torque resolution. The portion of the outer holder 10 which is designed to be axially movable like a tie rod is pulled to the right by the pressure pad 25 according to the illustration when the normal spring 24 is set correspondingly to its installation-related axial pretensioning.

An actuating device 28, which is, for example, a hydrostatic slave piston as shown in FIG. 1, is provided to open the stack of plates 19. The actuating device 28 works on the inner section 27 of the pressure pad 25, so that the normal spring 24 is compressed (and even further pretensioned) (shown to the left in the illustration), and so that the tensile force is reversed from the outer section 26 to the contact pressure plate 39.

In the configuration of the hybrid module 1 shown in FIG. 3, a leaf spring 54 or leaf spring set is optionally also provided, which is installed in a pretensioned manner between the torque-receiving means 7 or the axially fixed portion of the outer holder 10 and the contact pressure plate 39, so that the contact pressure can be increased (pull direction) and decreased (push direction) by the circumferential force occurring when closing. The leaf springs 54 connect the plate carrier 22 of the outer holder 10 and the contact pressure plate 39 to the torque-receiving means 7 forming the rotor carrier. The plate carrier 22 of the outer holder 10 is thus axially displaceable. The arrangement of the leaf springs 54 radially outside of the stack of plates 19 prevents or reduces at least a wobbling of the plate carrier 22 of the outer holder 10 in the event of frictional vibrations.

Here, the module shaft 30 or the transmission shaft 31 is supported on the housing 48 via a central bearing 49, e.g., a double row rolling bearing pretensioned in an O arrangement. In this case, a separate rotor carrier 23 is provided which can, however, also be integrated into an embodiment in the axially fixed section of the outer holder 10 connected to the transmission shaft connection point 6. (see FIG. 6).

Figure 4:
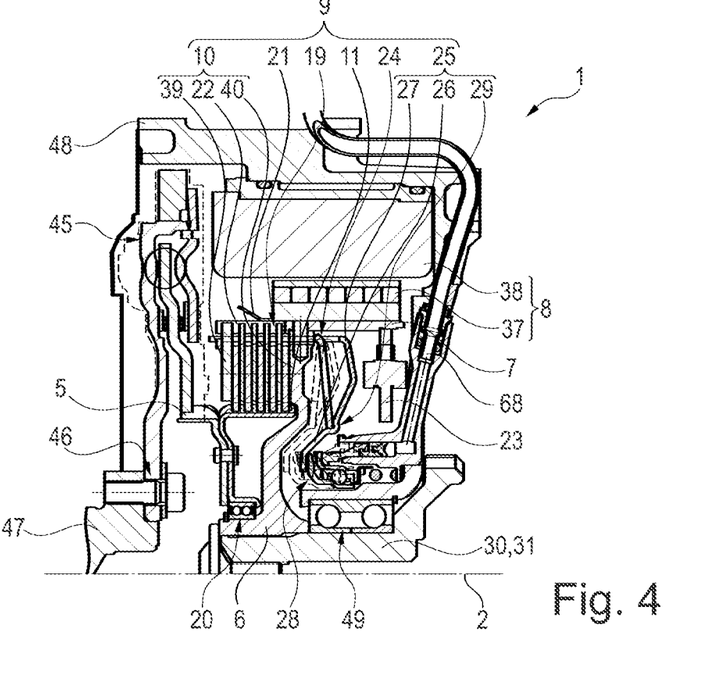
FIG. 4 shows a hybrid module having an outer holder formed in one piece with the torque-receiving means.

FIG. 4 shows a similar configuration as in FIG. 3 for the sake of clarity with largely the same or similar components, so that in this respect reference is made to the previous description. In this case, the outer holder 10 is axially fixed to the torque-receiving means 7 or its plate carrier 22 is designed in one piece with the torque-receiving means 7. Here, the counterplate 40 is (optionally) connected by means of a locking screw to the radially extending component, which forms the transmission shaft connection point 6 in one piece. In this case, the plate carrier 22 of the outer holder 10 is designed to be slotted. To protect the motor gap of the electrical machine 8, a thin tubular dust deflector 21 is (optionally) provided, which is positioned radially outwards and prevents abrasion and dust from entering the motor gap between the rotor 37 and the stator 38. The normal spring 24 is designed with (here in comparison to FIG. 3 only) with one membrane spring and works in the same way as the normal spring 24 as described in FIG. 3. In this case, the pressure pad 25 is designed in one piece with a tie rod, which acts on the contact pressure plate 39 with a tensile force, for example by means of a retaining ring. In this case the pressure pad 25 may be configured to be soft in its outer section 26, so that an additional modulation spring is not required.

Figure 5:
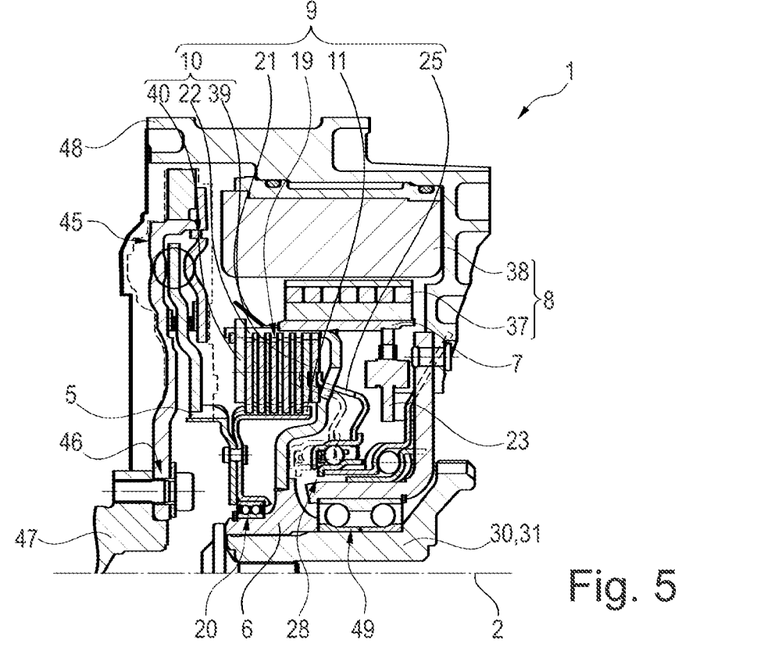
FIG. 5 shows a hybrid module having a normally open multiplate clutch.

FIG. 5 shows a hybrid module 1 in a similar configuration as in FIG. 4 for the sake of clarity with largely the same or similar components, so that in this respect reference is made to the description there. Here, the multiplate clutch 9 is now configured to be normally open, so that the stack of plates 19 is now only pressed in the event of active actuation by means of the actuating device 28. In comparison to the configurations shown above, the positions of the contact pressure plate 39 and the counterplate 40 are axially swapped and the pressure pad 25 acts (from the right in the illustration) on the contact pressure plate 39 with a pressure force as contact pressure (from right to left). In this case the pressure pad 25 may be designed to be soft so that a modulation spring is not required.

The torque-receiving means 7 and the plate carrier 22 of the outer holder 10 are separate components, which in this case are positively connected to one another, for example by means of welding. The radially extending portion of the outer holder 10 is designed in one piece with the plate carrier 22 and formed separately from the transmission shaft connection point 6, and the outer holder is welded to the transmission shaft connection point 6 in this embodiment. In this case, the actuating device 28 is a mechanical ball-ramp system, wherein, when a torque is applied from the outside, an axial distance between a first ramp (on the right here) and a second ramp (on the left here) is changed. This relative rotation of the two ramps is carried out with low friction via rolling elements (here designed as balls). The change of the axial distance between the two ramps is brought about by actuating the pressure pad 25.

Figure 6:
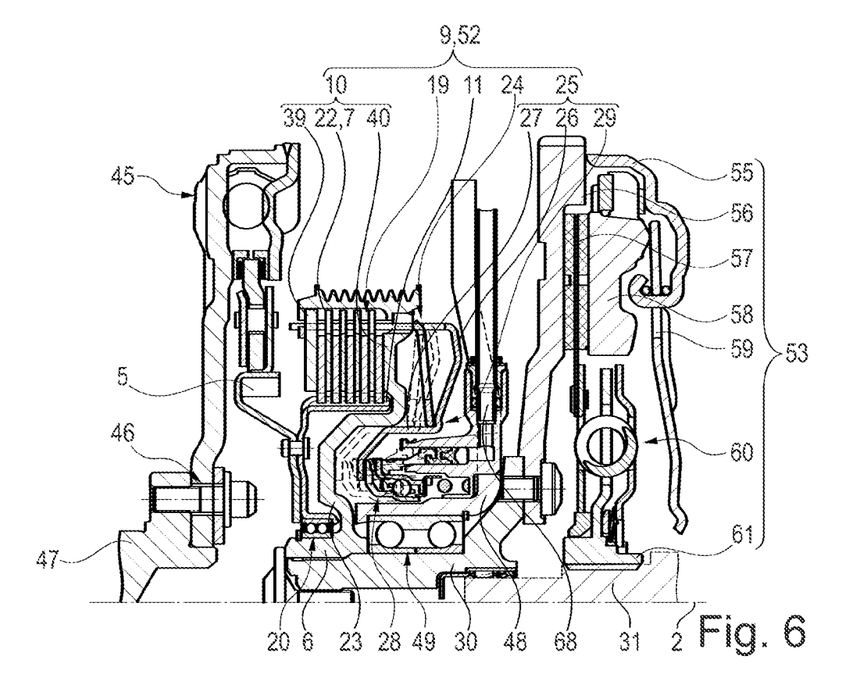
FIG. 6 shows a hybrid module having a friction disk.

FIG. 6 shows a configuration of a hybrid module 1 for an electrical machine 8 arranged off-axis (not shown, see FIG. 7), and a K1 clutch is also shown here, independently of this. The torque-receiving means 7, which is designed in one piece here as a belt pulley and as a plate carrier 22 of the outer holder 10, is connected (optionally) by means of welding to the radially extending and axially fixed component of the outer holder 10, including the counterplate 40, and also forms the counterbearing for the normal spring 24. This radially extending component of the outer holder 10 is also the rotor carrier 23 for the belt pulley and is designed in one piece with the transmission shaft connection point 6. For the sake of clarity, the actuating device 28 and the pressure pad 25, as well as the normal spring 24 and the configuration of the contact pressure plate 39 and the stack of plates 19 are designed as in the configuration in FIG. 4 and in this respect reference is made to the description there.

Here, the transmission shaft connection point 6 is torsionally rigidly connected to a module shaft 30, which in turn is permanently connected to the K1 counterplate 56 of the K1 clutch 53 in a torque-transmitting manner, here torsionally rigidly, e.g., screwed. The K1 clutch 53 includes a co-rotated clutch cover 55, a K1 contact pressure plate 58 and a K1 friction disk 57, which can be pressed against the K1 counterplate 56 supported by a K1 membrane spring 59 on the K1 clutch cover 55, so that a target torque is permanently connected to a transmission shaft 31 in a torque-transmitting manner, e.g., by means of a K1 torsional vibration damper 60 via a K1 transmission shaft hub 61.

It should be noted again that the similarity between the different configurations of the hybrid module 1 was selected here for the sake of clarity, and for simplification are shown in such a way that it can be seen that the different functional components in the illustrations according to FIGS. 3 to 6 are interchangeable with one another and further combinations are thus disclosed, for example by swapping the actuating devices 28, the configuration of the stack of plates 19 or the multiplate clutch 9, the coaxial arrangement of the electrical machine 8 or even the off-axis arrangement with a traction drive and more. Furthermore, the dual-mass flywheel 45 is only optionally interposed and in one embodiment is dispensed with, or it is connected downstream of the hybrid module 1 or integrated at another point in the hybrid module 1. Furthermore, at least one centrifugal pendulum, for example, is provided in the torque flow, e.g., axially close to the driveshaft 47. In one embodiment, the electrical machine 8 is not designed for cold starting of the internal combustion engine 50 and a starter motor, for example coupled via a gear ring, is additionally provided.

Figure 7:
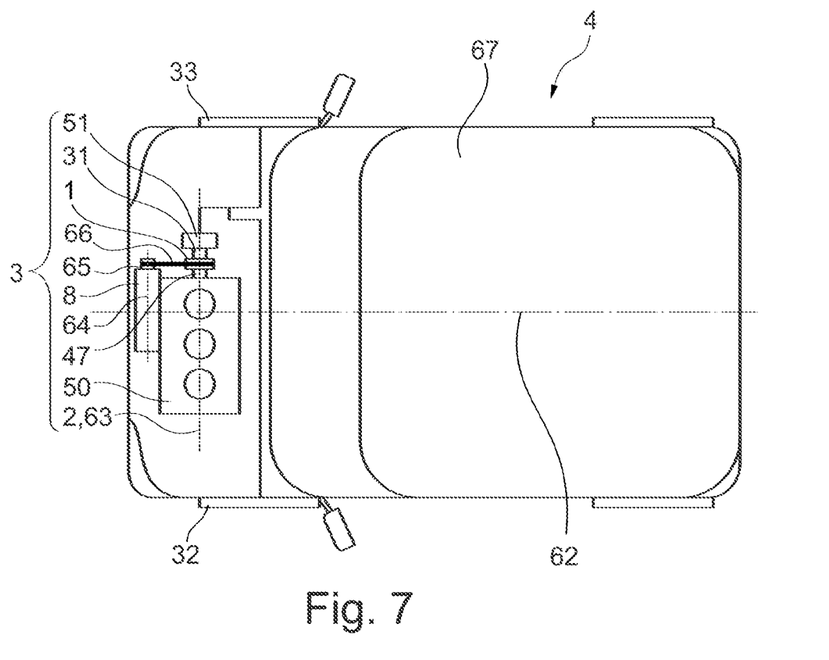
FIG. 7 shows a drive train in a motor vehicle having a hybrid module.

FIG. 7 purely schematically shows a (hybridized) drive train 3 in a motor vehicle 4, wherein the drive train 3 having the internal combustion engine 50, the electrical machine 8 and the hybrid module 1 having the rotational axis 2, the electric motor axis 64 or the combustion motor axis 63 is located in front of the driver's cab 67 and transverse to the longitudinal axis 62 of the motor vehicle 4. By means of the drive train 3, a left drive wheel 32 and a right drive wheel 33 can be driven via a chassis (not shown in detail), here optionally the front wheels of the motor vehicle 4. The electrical machine 8 is arranged off-axis and parallel to the internal combustion engine 50, and its electric motor shaft 65 is permanently connected to the hybrid module 1 in a torque-transmitting manner via a traction drive, for example a belt 66. The internal combustion engine 50 is permanently connected to the hybrid module 1 in a torque-transmitting manner via its driveshaft 47, and the hybrid module 1 in turn is connected to a transmission shaft 31 of a transmission 51, for example a manual transmission or a continuous transmission. The hybrid module 1 is designed, for example, as shown in FIG. 6, and includes a multiplate clutch 9 designed as a K0 clutch 52 (see FIG. 6). A K1 clutch 53 (see FIG. 6) is dispensed with here.

By means of the hybrid module proposed here and the specific arrangement of the outer holder and the inner holder of the multiplate clutch, it is possible to achieve low noise emissions when the internal combustion engine is being started from cold by means of the electrical machine of the hybrid module.

REFERENCE NUMERALS

1 Hybrid module
2 Rotational axis
3 Drive train
4 Motor vehicle
5 Driveshaft connection point
6 Transmission shaft connection point
7 Torque-receiving means
8 Electrical machine
9 Multiplate clutch
10 Outer holder
11 Inner holder
12 First outer plate
13 Second outer plate
14 Third outer plate
15 Fourth outer plate
16 First inner plate
17 Second inner plate
18 Third inner plate
19 Stack of plates
20 Rolling bearing
21 Dust deflector
22 Plate carrier
23 Rotor carrier
24 Normal spring
25 Pressure pad
26 Outer section
27 Inner section
28 Actuating device
29 Central section
30 Module shaft
31 Transmission shaft
32 Left drive wheel
33 Right drive wheel
34 Conventional hybrid module
35 Conventional inner holder
36 Conventional outer holder
37 Rotor
38 Stator
39 Contact pressure plate
40 Counterplate
41 Conventional plate carrier
42 Conventional rotor carrier
43 Conventional pressure pad
44 Conventional modulation spring
45 Dual-mass flywheel
46 Drive mount
47 Driveshaft
48 Housing
49 Central bearing
50 Internal combustion engine
51 Transmission
52 K0 clutch
53 K1 clutch
54 Leaf spring
55 K1 clutch cover
56 K1 counterplate
57 K1 friction disc
58 K1 contact pressure plate
59 K1 membrane spring
60 K1 torsional vibration damper
61 K1 transmission shaft hub
62 Longitudinal axis
63 Combustion motor axis
64 Electric motor axis
65 Electric motor shaft
66 Belt
67 Driver's cab
68 Hydrostatic line

The invention claimed is:
1. A hybrid module for a drive train of a motor vehicle, comprising:
a rotational axis;
a driveshaft connection point for receiving a first torque;
a transmission shaft connection point for outputting a second torque;
a torque-receiving means for receiving a third torque from an electrical machine; and
a dry multiplate clutch comprising:
an outer plate holder, torsionally rigidly connected to the transmission shaft connection point and to the torque-receiving means;

an inner plate holder, rotatable relative to the outer plate holder about the rotational axis and torsionally rigidly connected to the driveshaft connection point;

at least one outer plate axially movably mounted in the outer plate holder; and a plurality of inner plates, equal in number to one greater than a number of outer plates, axially movably mounted in the inner plate holder to form a stack of plates together with the at least one outer plate; and a dust deflector arranged radially outside of the stack of plates, wherein, when the stack of plates is axially pressed with a target contact pressure, a target torque can be transmitted from the driveshaft connection point to the torque-receiving means and the transmission shaft connection point.

2. The hybrid module of claim 1, further comprising a rolling bearing, wherein:

the inner plate holder is radially supported on the transmission shaft connection point by the rolling bearing; and the rolling bearing is arranged to be axially overlapping with the stack of plates.

3. The hybrid module of claim 1, wherein the outer plate holder comprises a plate carrier formed in one piece with the torque-receiving means.

4. The hybrid module of claim 3, wherein the plate carrier is formed in one piece with a rotor carrier.

5. The hybrid module of claim 1, further comprising:

a normal spring; and a pressure pad, the pressure pad comprising:

an outer section for transmitting an axial force to the stack of plates;

an inner section for receiving an axial actuating force from an actuating device; and a central section, wherein:

the normal spring and the pressure pad are for pressing the stack of plates;

the normal spring is pretensioned against the central section such that the stack of plates is held by the normal spring in a normal state; and the outer section is axially soft such that the pressure pad forms a modulation spring delaying transmission of an axial contact pressure on the stack of plates.

6. A drive train for a motor vehicle comprising:

an internal combustion engine comprising a driveshaft;

a transmission comprising a transmission shaft;

an electrical machine; and the hybrid module of claim 1, wherein:

the hybrid module is arranged to couple the electrical machine to the driveshaft and the transmission shaft with the torque-receiving means, and a torque transmission between the electrical machine and the transmission shaft can be released by the dry multiplate clutch.

7. The drive train of claim 6, wherein the electrical machine is for electric driving.

8. The drive train of claim 7, wherein the electrical machine is permanently connected to the transmission shaft in a torque-transmitting manner.

9. A motor vehicle comprising a drive wheel drivable by the drive train of claim 8.

10. A hybrid module for a drive train of a motor vehicle, comprising:

a rotational axis;

a driveshaft connection point for receiving a first torque;

a transmission shaft connection point for outputting a second torque;

a torque-receiving means for receiving a third torque from an electrical machine;

a dry multiplate clutch comprising:

an outer plate holder, torsionally rigidly connected to the transmission shaft connection point and to the torque-receiving means;

an inner plate holder, rotatable relative to the outer plate holder about the rotational axis and torsionally rigidly connected to the driveshaft connection point;

at least one outer plate axially movably mounted in the outer plate holder; and a plurality of inner plates, equal in number to one greater than a number of outer plates, axially movably mounted in the inner plate holder to form a stack of plates together with the at least one outer plate, wherein, when the stack of plates is axially pressed with a target contact pressure, a target torque can be transmitted from the driveshaft connection point to the torque-receiving means and the transmission shaft connection point a normal spring; and a pressure pad, the pressure pad comprising:

an outer section for transmitting an axial force to the stack of plates;

an inner section for receiving an axial actuating force from an actuating device; and a central section, wherein:

the normal spring and the pressure pad are for pressing the stack of plates;

the normal spring is pretensioned against the central section such that the stack of plates is held by the normal spring in a normal state; and the outer section is axially soft such that the pressure pad forms a modulation spring delaying transmission of an axial contact pressure on the stack of plates.

11. A hybrid module for a drive train of a motor vehicle, comprising:

a rotational axis;

a driveshaft connection point for receiving a first torque;

a transmission shaft connection point for outputting a second torque;

a torque-receiving means for receiving a third torque from an electrical machine;

a dry multiplate clutch comprising:

an outer plate holder, the outer plate holder being slotted and torsionally rigidly connected to the transmission shaft connection point and to the torque-receiving means;

an inner plate holder, rotatable relative to the outer plate holder about the rotational axis and torsionally rigidly connected to the driveshaft connection point;

at least one outer plate axially movably mounted in the outer plate holder; and a plurality of inner plates, equal in number to one greater than a number of outer plates, axially movably mounted in the inner plate holder to form a stack of plates together with the at least one outer plate; and a dust deflector arranged radially outside of the stack of plates, wherein, when the stack of plates is axially pressed with a target contact pressure, a target torque can be transmitted from the driveshaft connection point to the torque-receiving means and the transmission shaft connection point.

* * * * *